(12) United States Patent
Heidemann

(10) Patent No.: US 7,321,706 B2
(45) Date of Patent: Jan. 22, 2008

(54) OPTICAL FIBER COUPLER

(75) Inventor: Rainer Heidemann, Munich (DE)

(73) Assignee: TOPTICA Photonics AG, Gräfelfing (DE)

( * ) Notice: Subject to any disclaimer, the term of this patent is extended or adjusted under 35 U.S.C. 154(b) by 0 days.

(21) Appl. No.: 11/295,331

(22) Filed: Dec. 5, 2005

(65) Prior Publication Data

US 2006/0127000 A1   Jun. 15, 2006

(30) Foreign Application Priority Data

Dec. 6, 2004   (EP) .................................. 04028837

(51) Int. Cl.
*G02B 6/42* (2006.01)
*G02B 6/36* (2006.01)

(52) U.S. Cl. ........................... 385/25; 385/33; 385/52; 385/93

(58) Field of Classification Search ................. 385/25, 385/27, 31, 33–35, 39, 52, 88, 92, 93; 74/479.01
See application file for complete search history.

(56) References Cited

U.S. PATENT DOCUMENTS

| 4,585,193 A | 4/1986 | Rossberg |
| 4,635,887 A | 1/1987 | Hall et al. |
| 4,773,727 A | 9/1988 | Le Pivert et al. |
| 5,191,629 A * | 3/1993 | Kaiser ........................... 385/90 |
| 5,282,393 A | 2/1994 | Arnone et al. |
| 5,343,546 A * | 8/1994 | Cronin et al. ................... 385/52 |
| 5,351,330 A * | 9/1994 | Jongewaard ................... 385/93 |
| 5,422,725 A * | 6/1995 | Vilhelmsson ................ 356/399 |
| 5,659,645 A * | 8/1997 | Satake ........................... 385/33 |
| 5,812,258 A * | 9/1998 | Pierson ....................... 356/153 |
| 6,179,483 B1 * | 1/2001 | Kanazawa ..................... 385/93 |
| 6,891,608 B2 * | 5/2005 | Byer et al. .................... 356/153 |

FOREIGN PATENT DOCUMENTS

| DE | 3732566 | 4/1988 |
| EP | 0216307 | 4/1987 |

OTHER PUBLICATIONS

Article *Melles Griot Application Notes Online*, Aug. 2002, XP002313618 "Single Mode Fiber Launch".

* cited by examiner

*Primary Examiner*—Kevin S Wood
*Assistant Examiner*—John M Bedtelyon
(74) *Attorney, Agent, or Firm*—Collard & Roe, P.C.

(57) ABSTRACT

A fiber coupler for coupling light into an optical fiber and/or coupling light out of the fiber, has two holder elements, namely a fiber holder for holding the fiber, and a lens holder for holding a focusing lens. The holder elements are adjustable in the axial and transversal direction, respectively. In order to make such a fiber coupler available, which allows precise adjustment of the position of the focusing lens relative to the fiber, and which is furthermore compact in structure and inexpensive to produce, the holder elements are connected with a base body by way of at least one elastic monolithic joint, in each instance.

8 Claims, 3 Drawing Sheets

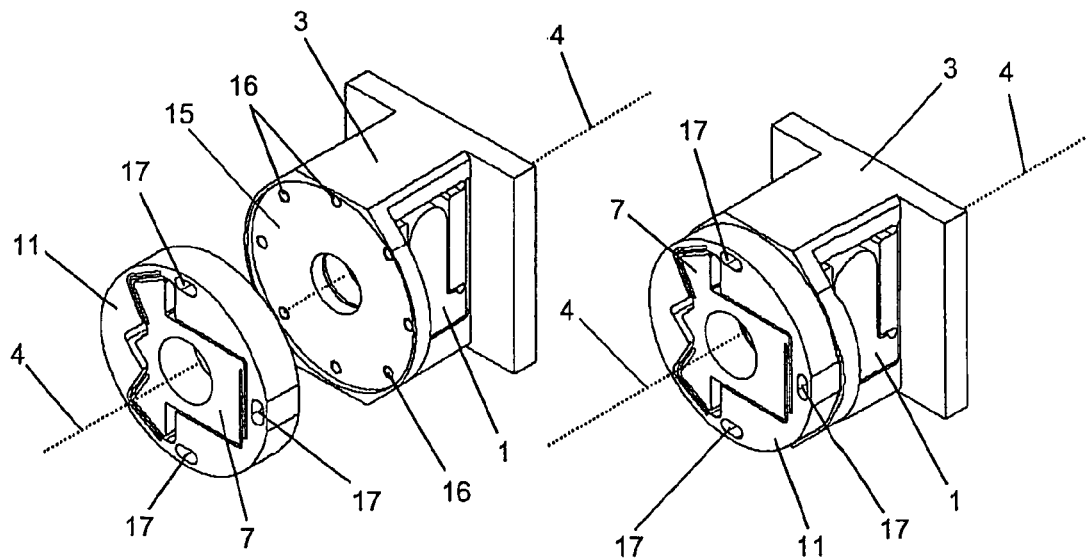
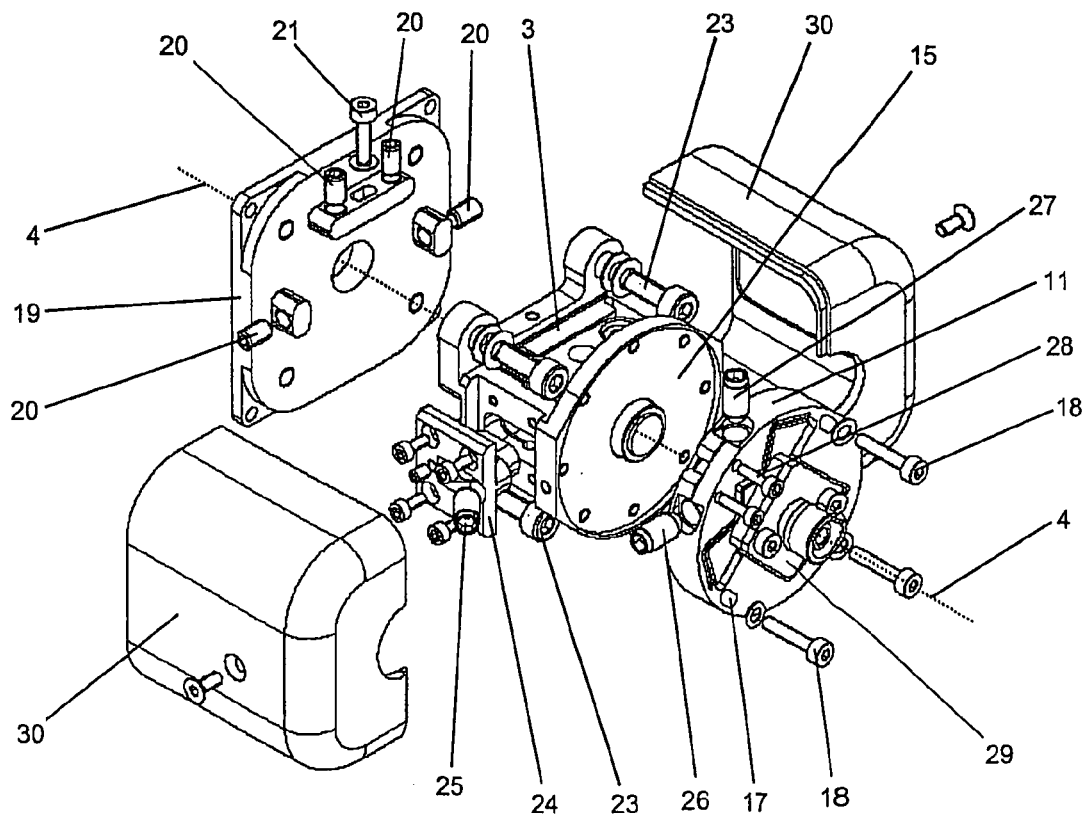
Fig. 5
Fig. 6

OPTICAL FIBER COUPLER

CROSS REFERENCE TO RELATED APPLICATIONS

Applicant claims priority under 35 U.S.C. §119 of European Application No. 04 028 837.5 filed Dec. 6, 2004.

BACKGROUND OF THE INVENTION

1. Field of the Invention

The present invention relates to a fiber coupler for coupling light into an optical fiber and/or coupling light out of the fiber. The fiber coupler has two holder elements, namely a fiber holder for holding the fiber, and a lens holder for holding a focusing lens, whereby the holder elements are adjustable in the axial and transversal direction, respectively. Such fiber couplers are needed, among other things, in the sector of research, for optical experiments, and in the field of telecommunications technology, for systems for optical signal transmission.

2. The Prior Art

High requirements with regard to the precision of the positioning of the fiber end relative to the focusing lens are set for fiber couplers for coupling a free light beam into an optical fiber and for coupling light out of the fiber. Usual so-called single mode fibers have a mode field diameter of only a few micrometers. In the case of single mode fibers for a light wavelength of 780 nm, for example, the mode field diameter is only 4 µm. To couple a free light beam into such a fiber, it must therefore be possible to position the focusing lens to a precision of a few micrometers, along the optical axis. Only in this way can optimal efficiency be achieved when coupling in. A tolerance of 10 µm already reduces the efficiency of the coupling by 10%. The efficiency of the coupling is even more sensitively dependent on the transversal positioning relative to the fiber end. A deviation from the optimal position of only one micrometer in the transversal direction reduces the efficiency of the coupling by 20%.

A fiber coupler of the type stated initially is previously known from U.S. Pat. No. 5,282,393 A, for example. In the case of the previously known coupler, transversal and axial setting members, respectively, are provided to adjust the holder elements for the fiber and the lens, respectively. These members essentially consist of threaded rods that are guided in corresponding threaded bores of a base element. In this previously known coupler, the setting member provided for axial adjustment of the focusing lens along the optical axis consists of three threaded rods having screws guided on them. These screws are synchronously turned by means of a gear mechanism, in order to thereby allow linear movement of the focusing lens along the optical axis.

It is a disadvantage of the aforementioned fiber coupler that it consists of a plurality of mechanical components for the various setting members, which must be produced with the greatest precision. For this reason, the previously known fiber coupler is extremely expensive in its production. It is a further disadvantage that the gear mechanism described above can hardly be produced with sufficient precision for the axial adjustment of the focusing lens, in order to satisfy the requirements for fiber couplers used with single mode fibers, as mentioned above. Another disadvantage results from the complicated mechanical design of the previously known fiber coupler. It is a disadvantage that the structure of the coupler is not very compact. Finally, another disadvantage is the insufficient precision in the adjustment of the lens or the fiber end in the transversal direction, respectively, as well as the poor long-term stability of the adjustment.

SUMMARY OF THE INVENTION

Against this background, it is an object of the present invention to provide an improved fiber coupler, which allows adjustment of the focusing lens or the fiber, respectively, in the axial or transversal direction, respectively, with sufficient precision and long-term stability. In addition, the coupler should be compact in structure and inexpensive to produce.

These and other objects are accomplished according to the invention by providing a fiber coupler of the type stated initially, in which the holder elements are connected with a base body by way of at least one elastic monolithic joint, in each instance.

In the case of the fiber coupler according to the invention, the adjustability of the fiber or of the focusing lens, respectively, is based on the use of elastic monolithic joints. Because of the elastic properties of the monolithic joints, the setting mechanism needed for the fiber coupler can be implemented in particularly simple manner. Setting is simple because in order to make an adjustment, a force has to be exerted merely in one direction, counter to the elastic reset force of the joint. The reset force then automatically assures the long-term stability of the adjustment. The fiber coupler according to the invention has the advantage that the holder elements and the related base bodies can be produced in one piece with one another (monolithic) so that each holder element is integral with its associated base body. For this purpose, known electro-erosion methods, such as wire erosion, for example, can be used. The fiber coupler according to the invention therefore can be produced both cost-effectively and compactly.

In the fiber coupler according to the invention, it is practical if the monolithic joint of one holder element has a greater bending stiffness crosswise to the optical axis than parallel to it, while the monolithic joint of the other holder element has a greater bending stiffness parallel to the optical axis than orthogonal or vertical to it. In this way, the result is achieved that the holder elements for adjustment in the axial and transversal direction, respectively, are uncoupled from one another. The guidance of the movement of the individual holder elements that is required for the adjustment is achieved, in this connection, by means of the special configuration of the monolithic joints. Specifically, the monolithic joints have a significantly greater bending stiffness perpendicular to the desired movement direction than parallel to it, in each instance.

In order to adjust the focusing lens or the fiber, respectively, essentially parallel to the optical axis, it is practical if one of the holder elements is connected with the base body by way of a total of four monolithic joints and two lever arms, whereby the two lever arms are disposed in the manner of a parallelogram. By means of the arrangement in the shape of a parallelogram, an essentially linear movement is implemented. Tilting or turning of the focusing lens or of the fiber is avoided. All that occurs is an extremely slight parasitic arc movement of the holder element, but this movement has no noticeable effects if the stroke of the linear movement as a whole is limited.

For transverse adjustment, one holder element can be connected with the base body via at least two monolithic joints. Specifically, the connection is made so that the holder element is adjustable in two directions perpendicular to the optical axis. The arrangement of the monolithic elements can be selected so that the holder element is independently adjustable in two orthogonal directions perpendicular to the optical axis. It has been shown that plate joints are particularly suitable as monolithic joints for transversal adjustment. An arrangement of a total of three plate joints has proven to be practicable. In this connection, two of the plate joints are elastically stretchable in orthogonal directions perpendicular to the optical axis, specifically without elastic deflection of the third plate joint that is arranged in the center with reference to the two first plate joints.

In the fiber coupler according to the invention, an adjustment possibility in the axial or transversal direction, respectively, can be implemented in particularly simple manner. Such adjustment is made possible by an adjustment screw for fixing the position of the holder element relative to the base body, which screw engages on at least one of the holder elements. By means of this adjustment screw, a force counter to the elastic reset force of the monolithic joint acts on the corresponding holder element. Therefore, one adjustment screw is sufficient for adjustment for each adjustment direction, since this screw, interacting with the elastic properties of the monolithic joint, will determine the position of the holder element and, at the same time, fix it in place.

In the case of the fiber coupler according to the invention, as already explained, separate holder elements are used, which are adjustable independent of one another, either in the axial direction or in the transversal direction. One of the holder elements forms the fiber holder of the fiber coupler according to the invention, which serves to hold the fiber. The other holder element forms the lens holder for holding the focusing lens. In the fiber coupler according to the invention, it has proven to be particularly practical if the base body of the fiber holder can be fixed in place on the base body of the lens holder in different discrete angle positions with reference to the optical axis. This feature is important so that when using optical fibers that maintain polarization, the fiber can be disposed in accordance with the polarization direction. In practice, discrete angle steps of 45° with a precision adjustment possibility in the range of +/−4° are sufficient in this connection.

For the purpose of thermal insulation, it is practical to provide a housing for the fiber coupler according to the invention, which surrounds the holder elements and the related base bodies on all sides.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 5 is a three-dimensional view of a fiber coupler with lens holder and fiber holder; and FIG. 6 is an exploded view of the fiber coupler according to an embodiment of the invention.

DETAILED DESCRIPTION OF PREFERRED EMBODIMENTS

Figure 1:
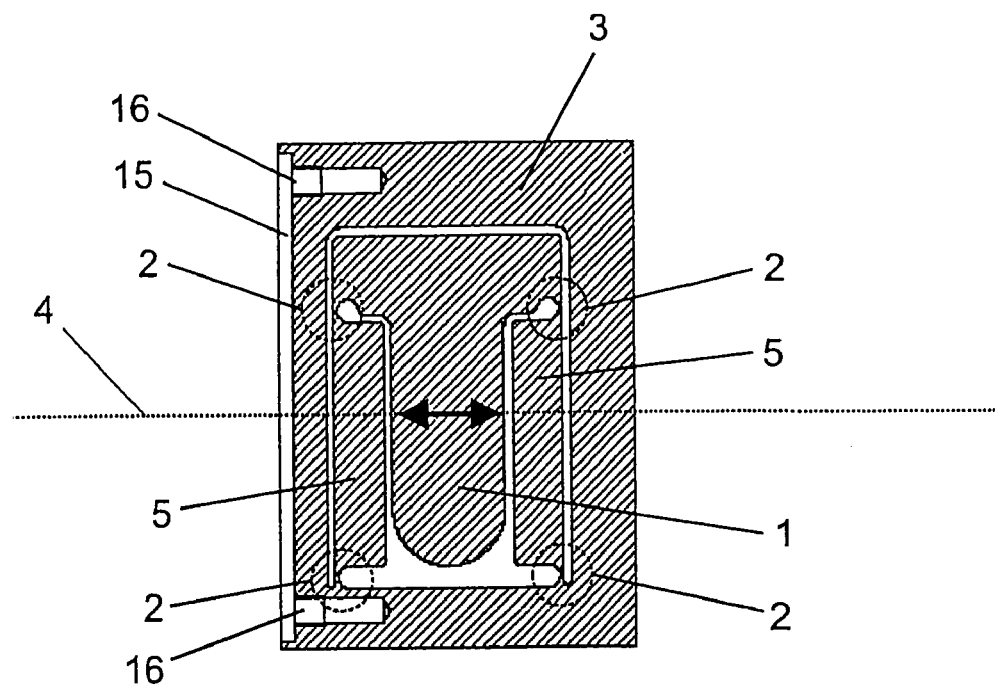
FIG. 1 is a sectional side view of a lens holder of the fiber coupler according to an embodiment the invention.
Figure 2:
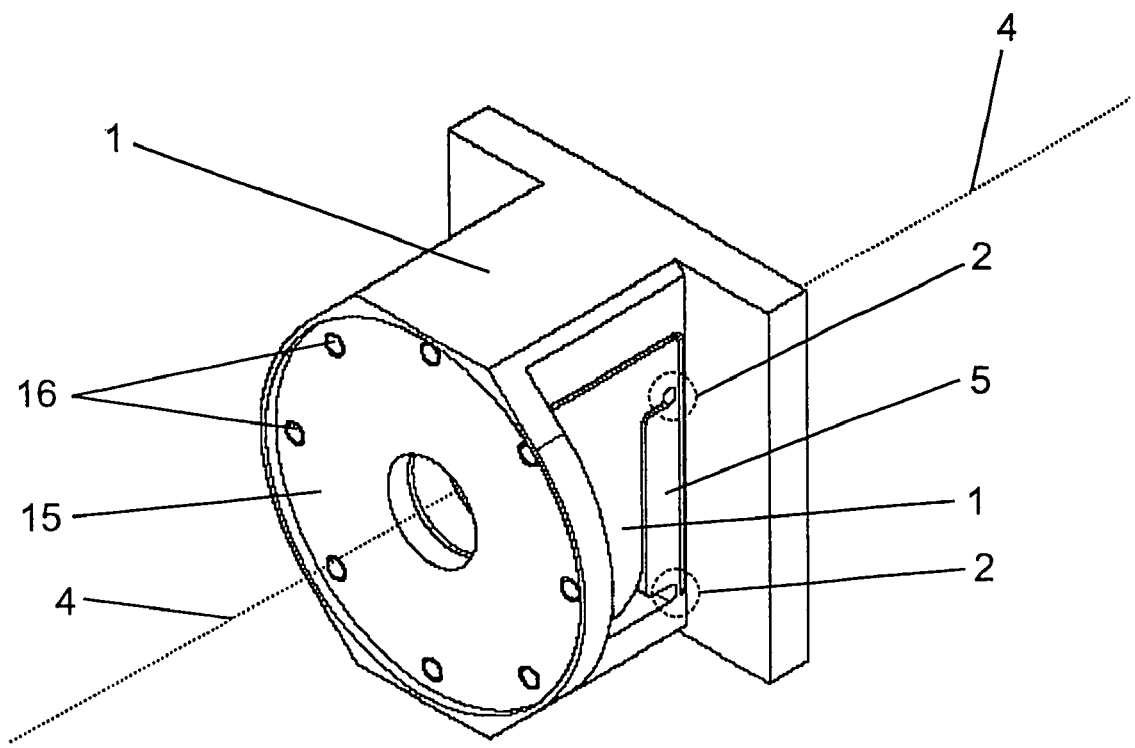
FIG. 2 is a three-dimensional view of the lens holder according to the embodiment of FIG. 1.

Turning now in detail to the drawings, FIGS. 1 and 2 show the element of a fiber coupler according to an embodiment of the invention that is provided for holding the focusing lens (not shown). The focusing lens is fixed in place in a pre-adjusted position on a lens holder 1.

Lens holder 1 is connected with a base body 3 by way of a total of four elastic monolithic or solid joints 2. Lens holder 1 is adjustable in linear manner in the axial direction, namely parallel to the optical axis 4. For this purpose, monolithic joints 2 have a clearly greater bending stiffness crosswise to optical axis 4 than parallel to it. In order to allow an essentially purely linear movement of the focusing lens, lens holder 1 is connected with base body 3 by way of the four monolithic joints 2 and two lever arms 5. In this connection, the two lever arms 5 are disposed in the manner of a parallelogram. This arrangement results in linear adjustability of the focusing lens, as indicated in FIG. 1 by the double arrow. The linear movement runs parallel to optical axis 4. This linear movement takes place, in the case of the exemplary embodiment shown, without any noteworthy parasitic arc movements, because the two lever arms 5 are many times longer than the maximum possible stroke of the linear movement. Lever arms 5, which are disposed in the manner of a parallelogram, translate a force that acts on lens holder 1, for example by means of an adjustment screw not shown in FIGS. 1 and 2, into the linear movement shown with the double arrow, by way of monolithic joints 2.

Figure 3:
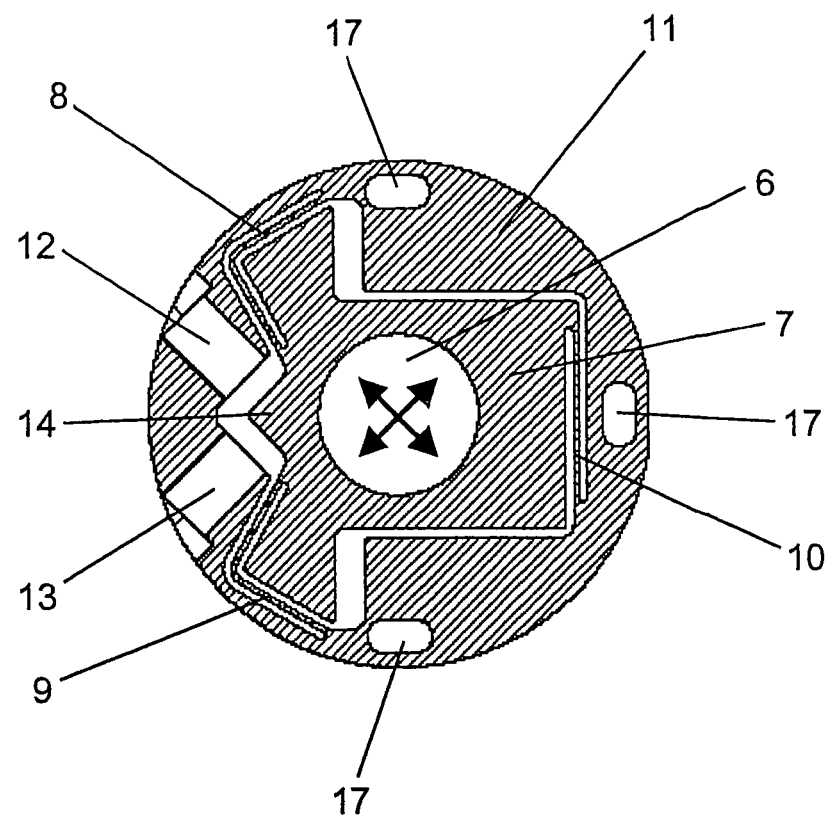
FIG. 3 is a sectional top view of a fiber holder of the fiber coupler according to an embodiment of the invention.
Figure 4:
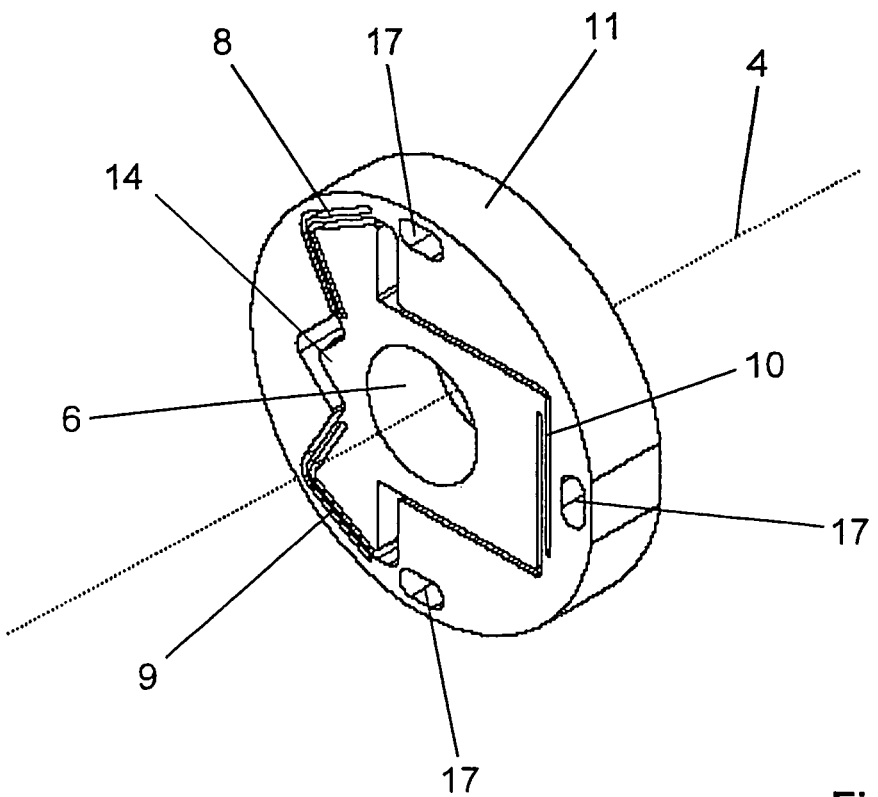
FIG. 4 is a three-dimensional view of the fiber holder.

FIGS. 3 and 4 show the element of the fiber coupler according to an embodiment of the invention that is provided to hold and adjust the fiber (not shown). The fiber is fixed in place in a central accommodation or receiving opening 6 of a fiber holder 7. Fiber holder 7 is connected with a disk-shaped base body 11 by way of a total of three monolithic joints 8, 9, and 10. Monolithic joints 8, 9, and 10 are configured as plate joints that have a significantly greater bending stiffness parallel to the optical axis 4 than perpendicular to it.

The special symmetrical arrangement of plate joints 8, 9, and 10 can be seen in FIGS. 3 and 4. By means of this arrangement, the fiber is adjustable perpendicular to optical axis 4, relative to base body 11, in the directions that are orthogonal to one another, as indicated by the double arrows in FIG. 3. For this purpose, adjustment screws can be screwed into threaded bores 12 and 13; their ends act on an adjustment projection 14 of the fiber holder 7. Because of the design of the fiber holder according to FIGS. 3 and 4, the movement of the fiber is uncoupled in the directions perpendicular to optical axis 4, and is independent of the adjustment of the focusing lens according to the configuration of the lens holder that is shown in FIGS. 1 and 2.

In FIG. 5, it can be seen how the lens holder can be connected with the fiber holder. Base element 3 of the lens holder has a circular flange 15 having threaded bores 16 that are disposed at an angle interval of 45°. Oblong holes 17 in base element 11 of the fiber holder correspond with these bores. Base body 11 of the fiber holder can be screwed onto base body 3 of the lens holder, at its flange 15. Specifically, base body 11 can be screwed onto base body 3 in different discrete angle positions with reference to optical axis 4. In this connection, the angle position can be selected in 45° steps, whereby oblong holes 17 allow a precise adjustment in the range of +/−4°.

FIG. 6 shows the fiber coupler according to the invention in an exploded view. Base body 3 of the lens holder is screwed onto base body 11 of the fiber holder by way of flange 15, specifically by means of screws 18. The entire arrangement of fiber holder and lens holder can be fixed in place on a back wall element 19, whereby centering screws 20 serve for horizontal and vertical centering, respectively. Additionally, tension can be exerted on the unit of lens holder and fiber holder by way of a screw 21 that engages in a threaded bore 22. Fixation screws 23 serve for fixation on back wall element 19. Furthermore, a focus screw block 24 is provided, which can be screwed onto base body 3. A focus adjustment screw 25 acts on the lens holder to adjust it axially. For transversal adjustment of the fiber, two adjustment screws 26 and 27 are provided, which act on the fiber holder in directions that are perpendicular to one another. Adjustment screws 26 and 27 can be fixed in place by means of counter-screws 28. A fiber accommodation 29 serves to fix the fiber in place on the fiber holder. Two housing half-shells 30 serve as the side wall. In this way, the entire arrangement is surrounded on all sides by shells 30 together with back wall element 19, for the purpose of thermal insulation.

Although at least one embodiment has been shown and described, it is to be understood that many changes and modifications may be made thereunto without departing from the spirit and socpe of the invention as defined in the appended claims.

What is claimed is:

1. A fiber coupler for coupling light into or out of an optical fiber comprising:
   (a) first and second base bodies;
   (b) a first holder element comprising a fiber holder for holding an optical fiber;
   (c) a second holder element comprising a lens holder for holding a focusing lens;
   wherein one of said first and second holder elements is adjustable in an axial direction and another of said first and second holder elements is adjustable in a transverse direction;
   wherein one of said first and second holder elements is connected to said first base body by four monolithic joints and two lever arms, said lever arms being pivotable around said monolithic joints and being arranged perpendicular to an optical axis as a parallelogram so that said holder element is adjustable in a linear manner substantially parallel to the optical axis; and
   wherein another of said first and second holder elements is connected to said second base body by at least one elastic monolithic joint.

2. The fiber coupler according to claim 1, wherein at least one of the monolithic joints of one of said first and second holder elements has a greater bending stiffness crosswise to the optical axis than parallel to the optical axis.

3. The fiber coupler according to claim 2, wherein at least one monolithic joint of another of said first and second holder elements has a greater bending stiffness parallel to the optical axis than orthogonal to the optical axis.

4. The fiber coupler according to claim 1, wherein one of the first and second holder elements is connected with the second base body by way of at least two monolithic joints so that the holder element is adjustable in two directions perpendicular to the optical axis.

5. The fiber coupler according to claim 4, wherein each monolithic joint is a plate joint.

6. The fiber coupler according to claim 1, further comprising an adjustment screw engaging on at least one of the holder elements for fixing the position of the holder element relative to the associated base body.

7. The fiber coupler according to claim 1, wherein said first base body is a base body for the lens holder and said second base body is a base body for the fiber holder and the base body of the fiber holder is securable in place on the base body of the lens holder in different discrete angle positions with reference to the optical axis.

8. The fiber coupler according to claim 1, further comprising a housing surrounding the holder elements and the first and second base bodies.

* * * * *